United States Patent [19]
Huvey et al.

[11] 3,744,505
[45] July 10, 1973

[54] SAFETY PIPING FOR FLUID CONVEYANCE

[75] Inventors: Michel Huvey, Bougival; Germain Le Meur, Stains, both of France

[73] Assignees: Institut Francais du Petrole des Carburants et Lubrifiants, Rueil-Malmaison; Societe Anonyme Pour Tous Appareillages Mecaniques (S.A.T.A.M.), LaCourneuve, both of France

[22] Filed: Oct. 8, 1971

[21] Appl. No.: 187,786

[30] Foreign Application Priority Data
Oct. 15, 1970  France .............................. 7037353

[52] U.S. Cl. .................... 137/68, 138/99, 138/111, 138/149
[51] Int. Cl. .......................................... F16l 55/16
[58] Field of Search ................. 137/68; 138/97, 99, 138/111, 112, 113, 149

[56] References Cited
UNITED STATES PATENTS
3,269,422  8/1966  Matthews et al. ................. 138/111
3,402,731  9/1968  Martin ............................. 138/149 X
3,665,968  5/1972  DePutter ......................... 138/149 X

*Primary Examiner*—Henry T. Klinksiek
*Attorney*—Craig, Antonelli et al.

[57] ABSTRACT

Safety piping for fluid conveyance comprising, in association with a main fluid conveying pipe, an auxiliary safety pipe containing an auxiliary fluid, separate from the main pipe but in the vicinity thereof and adapted to be broken when the assembly of both pipes is subjected to excessive stresses and in any case when the main pipe breaks, and a safety manometric device adapted to stop the feeding of the main pipe with fluid to be conveyed in response to a decrease of the auxiliary fluid pressure.

5 Claims, 1 Drawing Figure

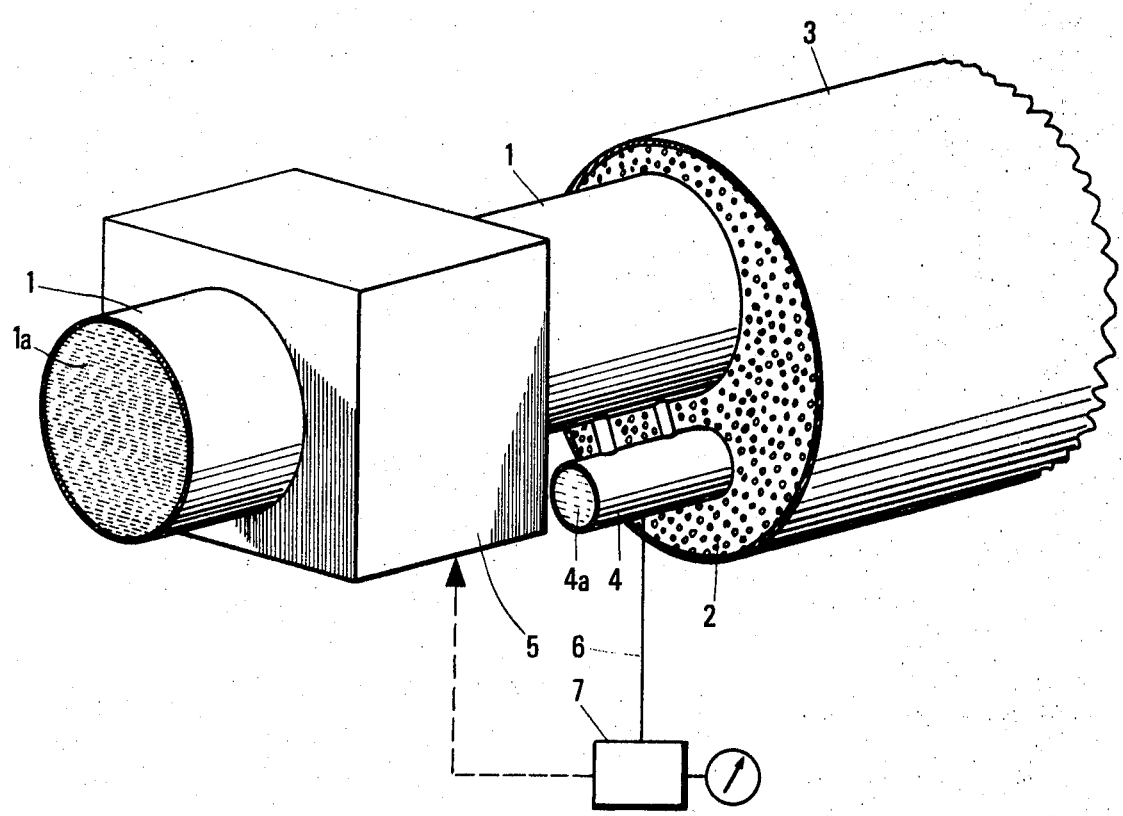

SAFETY PIPING FOR FLUID CONVEYANCE

This invention relates to a safety piping for conveying fluids, more particularly hydrocarbons.

In order to avoid the pollution of the ground and the underground waters there may be deemed of interest to make use of double pipes for conveying hydrocarbons such as gasolines or gas-oil, such pipes being also usable for improving the safety conditions even if they are not underground, when the hydrocarbons conveyed therethrough are under pressure.

Under these conditions, in the case of perforation of the internal pipe, due to the corrosion, the external pipe, forming an envelope, is supposed to insure the sealing.

However, in the case of underground pipings, the internal pipe which is subjected to corrosion only to a small extent when it conveys refined hydrocarbons, since it is otherwise protected against the corrosion from the ground by the external envelope, will be corroded after a long time whereas the external envelope, which is subjected to the action of stray currents and of the ground attacking agents, will be corroded and perforated much before the internal pipe. Accordingly the protection will not be efficient.

The use of an auxiliary fluid (liquid or gas) under slight pressure, filling the annular space between the two pipes makes it possible, by using any pressure gage, to detect a leakage of the internal pipe as well as of the external envelope and to give the alarm.

Such a device suffers from the drawback that any leakage of the internal pipe will probably result in the mixing of the hydrocarbons with the auxiliary fluid filling said annular space.

It is an object of this invention to avoid this drawback by making use of a safety pipe comprising in combination with a fluid conveying pipe provided with a sealing sheath a safety pipe placed in the vicinity of the fluid conveying pipe, and adapted to contain an auxiliary fluid and to cooperate with a manometric safety device interrupting the feeding of the pipe with fluid to convey in the case of breakage of said safety pipe, resulting in a change of the auxiliary fluid pressure.

Under these conditions, in view of the fact that, in contrast to the prior art, the security pipe does not surround the hydrocarbon conveying pipe, the manometric safety device is not sensitized by a hydrocarbon leak resulting from the perforation of the internal pipe and said leak is automatically stopped by the sealing sheath, but however, in the case of accidental breakage of the fluid conveying pipe or main pipe, together with the safety pipe, the security device operates and interrupts the feeding with hydrocarbons of the main pipe. Thus, according to the invention, the problem of stopping a small hydrocarbon leak and the safety problem arising in case of piping breakage are dealt with separately.

According to a preferred embodiment of the invention, the sealing sheath will be made of foam of a material capable of stopping a hydrocarbon leak by the choking resulting from the expansion of said material when contacted with hydrocarbons.

The safety pipe may, for example, be embedded in a sheath of foam material or secured to a protecting envelope surrounding the main pipe sheath, on the external wall of the main pipe or preferably secured to the main pipe so as to make sure that it would break with it in the case where the piping is subjected to a substantial deformation. It may be advantageous to make the safety pipe of a material more brittle than that forming the main pipe, so that, in case of a shock on the piping, the safety pipe will break before the main pipe, thereby producing a more rapid stopping of the hydrocarbon flow through the action of the manometric safety device.

The figure of the accompanying drawing shows a cross-section of an embodiment of hydrocarbon conveying piping according to the invention. On this figure reference 1 indicates the pipe conveying hydrocarbons 1 a and 2 indicates a sheath of foam rubber, e.g. of butyl rubber, said sheath being covered with a protecting envelope 3.

In case of perforation of the pipe 1, the foam rubber of the sheath 2 will be in contact with hydrocarbons, said contact having the effect of causing the expansion of the rubber thereby resulting in the disappearance of pores and accordingly in the transformation of the foam rubber to a solid and tight material which chokes the hydrocarbon leakage. This mechanism results in a self-sealing phenomenon.

The piping also comprises in the vicinity of the main pipe 1 a safety pipe 4. This safety pipe contains an auxiliary fluid 4 a and is connected through line 6 to a safety manometric device 7 of any suitable type known in the art, adapted to stop the hydrocarbon feeding of the main pipe 1 (by closure of a valve 5) in case of breakage of the safety pipe 4 resulting in a pressure change of the auxiliary fluid 4 a.

Consequently the manometric safety device 7 is not actuated in case of perforation of pipe 1, the hydrocarbon leak being however automatically stopped due to the above indicated self-sealing phenomenon, but in the case of accidental breakage of the piping including that of pipe 4, the manometric device is actuated and stops the hydrocarbon flow through pipe 1, said stopping occurring even more quickly when the safety pipe 4 is made of a more brittle material than that forming the pipe 1 as above-mentioned, so that the pipe 4 be broken before pipe 1.

The foam material forming the sheath 2 may be selected from the following non-limitative list : butyl rubber, natural rubbers, polychloroprene, polybutadienes, unsatured ethylene-propylenes, polyepoxypropane, urethane and the like.

The used elastomers must not contain a substantial amount of the usual plasticizers soluble in the hydrocarbons conveyed through pipe 1, said plasticizers being for example hydrocarbon heavy fractions (heavy, naphthenic, aromatic oils), esters such as butyl- or isooctylphthalates, halogenated hydrocarbons, particularly chlorinated paraffins.

According to a preferred embodiment there will be used as material forming the sheath 2, a foam material having a volume of pores at least equal to the expansion volume of the solid material when contacted with hydrocarbons, so that said expansion volume be completely absorbed by a corresponding decrease of the voids of the pores in the foam material without subjecting the pipe 1 and its protecting envelope 3 to stresses which might produce a flow of the sheath 2 towards the inside of pipe 1, at the place of the hydrocarbon leakage, or a local bursting of the protecting envelope 3.

From the foregoing description, one skilled in the art can easily ascertain the essential characteristics of this invention and, without departing from the spirit and scope thereof, can make various changes and modifications of the invention to adapt it to various usages and conditions. Consequently such changes and modifications are properly, equitably and intended to be within the full range of equivalence of the following claims.

What we claim is:

1. A safety piping for fluid conveyance comprising in combination a main fluid conveying pipe provided with a sealing sheath and a safety pipe separate from the main pipe, in the vicinity thereof, said safety pipe being destined to contain an auxiliary fluid and being connected to a safety manometric device for stopping the feeding of the main pipe with fluid to be conveyed in case of breakage of said safety pipe resulting in a change of the auxiliary fluid pressure.

2. A piping according to claim 1, used for conveying hydrocarbons, wherein the sealing sheath is formed of a material capable of stopping a hydrocarbon leakage by a choking resulting from the expansion of said material when contacted with said hydrocarbons.

3. Safety piping according to claim 1, wherein said safety pipe is secured to the main pipe.

4. Safety piping according to claim 1, wherein said safety pipe is embedded in said sealing sheath.

5. Safety piping according to claim 1 wherein said safety pipe is made of a more brittle material than that forming the main pipe.

* * * * *